United States Patent
Matsen et al.

(10) Patent No.: US 10,569,504 B2
(45) Date of Patent: Feb. 25, 2020

(54) PANEL AND METHOD OF FORMING A THREE-SHEET PANEL

(71) Applicant: The Boeing Company, Chicago, IL (US)

(72) Inventors: Marc R. Matsen, Seattle, WA (US); Lee C. Firth, Renton, WA (US); David S. Nansen, Lopez Island, WA (US); Michael R. Zolnowski, Saint Charles, MO (US); Carey E. Wilkinson, Summerville, SC (US); Gregory A. Foltz, San Diego, CA (US)

(73) Assignee: The Boeing Company, Chicago, IL (US)

( * ) Notice: Subject to any disclaimer, the term of this patent is extended or adjusted under 35 U.S.C. 154(b) by 117 days.

(21) Appl. No.: 15/443,235

(22) Filed: Feb. 27, 2017

(65) Prior Publication Data
US 2018/0244016 A1 Aug. 30, 2018

(51) Int. Cl.
*B32B 7/02* (2019.01)
*B32B 15/01* (2006.01)
(Continued)

(52) U.S. Cl.
CPC .................. *B32B 7/02* (2013.01); *B32B 1/00* (2013.01); *B32B 3/12* (2013.01); *B32B 3/28* (2013.01); *B32B 7/027* (2019.01); *B32B 9/005* (2013.01); *B32B 15/015* (2013.01); *B32B 18/00* (2013.01); *C22C 19/05* (2013.01); *C22C 19/055* (2013.01); *B32B 2250/03* (2013.01); *B32B 2250/40* (2013.01); *B32B 2262/101* (2013.01); *B32B 2262/106* (2013.01); *B32B 2307/30* (2013.01); *B32B 2307/732* (2013.01); *B32B 2605/18* (2013.01); *C22C 30/00* (2013.01)

(58) Field of Classification Search
CPC ................ B23P 15/008; B23P 2700/01; Y10T 29/49629; Y10T 29/49625; Y10T 29/49805
See application file for complete search history.

(56) References Cited

U.S. PATENT DOCUMENTS 3,927,817 A * 12/1975 Hamilton ............. B21D 26/055
228/157
4,882,823 A * 11/1989 Weisert ................ B21D 26/055
29/6.1
(Continued)

FOREIGN PATENT DOCUMENTS

EP  0 507 067 A2  10/1992
EP  1 957 216 B1  7/2009

OTHER PUBLICATIONS

Intellectual Property Office, Examination Report, App. No. GB1802963.7 (dated May 14, 2019).
(Continued)

*Primary Examiner* — Jason L Vaughan
(74) *Attorney, Agent, or Firm* — Walters & Wasylyna LLC

(57) ABSTRACT

A panel comprises a first face sheet and a second face sheet spaced apart from the first face sheet. The panel further comprises a core sheet intercoupled between the first face sheet and the second face sheet. Each of the first and second face sheets is made of a material having a thermal expansion that is different from the thermal expansion of the other face sheet.

23 Claims, 7 Drawing Sheets

(51) Int. Cl.
*C22C 19/05* (2006.01)
*C22C 30/00* (2006.01)
*B32B 7/027* (2019.01)
*B32B 18/00* (2006.01)
*B32B 3/12* (2006.01)
*B32B 9/00* (2006.01)
*B32B 3/28* (2006.01)
*B32B 1/00* (2006.01)

(56) References Cited

U.S. PATENT DOCUMENTS

| | | | | |
|---|---|---|---|---|
| 5,118,026 A * | 6/1992 | Stacher | ............... | B23K 20/18 228/157 |
| 5,204,161 A * | 4/1993 | Pettit | ............... | B29C 49/0047 428/174 |
| 5,330,092 A * | 7/1994 | Gregg | ............... | B21D 26/055 228/157 |
| 5,398,410 A * | 3/1995 | Yasui | ............... | B21D 26/055 228/157 |
| 5,423,123 A * | 6/1995 | McQuilkin | ......... | B21D 53/045 29/421.1 |
| 5,530,227 A | 6/1996 | Matsen et al. | | |
| 5,645,744 A | 7/1997 | Matsen et al. | | |
| 5,683,608 A | 11/1997 | Matsen et al. | | |
| 5,715,644 A * | 2/1998 | Yasui | ............... | B21D 26/055 228/157 |
| 5,728,309 A | 3/1998 | Matsen et al. | | |
| 5,881,459 A * | 3/1999 | Yasui | ............... | B21D 26/055 228/190 |
| 6,138,898 A * | 10/2000 | Will | ............... | B21D 26/055 228/157 |
| 6,180,932 B1 | 1/2001 | Matsen et al. | | |
| 6,739,029 B2 * | 5/2004 | Debaisieux | ......... | B21D 26/055 228/157 |
| 6,914,225 B2 | 7/2005 | Fischer et al. | | |
| 7,134,176 B2 * | 11/2006 | Price | ............... | B21D 26/055 29/421.1 |
| 7,406,849 B2 * | 8/2008 | Ueno | ............... | B21D 26/021 228/112.1 |
| 7,533,794 B2 * | 5/2009 | Comley | ............... | B23K 20/023 228/157 |
| 10,112,229 B2 * | 10/2018 | Matsen | ............... | B21D 26/029 |
| 2003/0155407 A1 * | 8/2003 | Yajima | ............... | B21D 26/055 228/193 |
| 2007/0102494 A1 * | 5/2007 | Connelly | ............... | B21D 26/055 228/157 |
| 2009/0169918 A1 | 7/2009 | Haynes et al. | | |

OTHER PUBLICATIONS

Incoloy® alloy 909, Special Metals Corporation, www.specialmetals.com (Sep. 2004).
Inconel® nickel-chromium alloy 625, Special Metals Corporation, www.specialmetals.com (Aug. 2013).

* cited by examiner

PANEL AND METHOD OF FORMING A THREE-SHEET PANEL

FIELD

The present application relates to multilayer structures, and is particularly directed to a panel and a method of forming a three-sheet panel.

BACKGROUND

Multilayer structures are typically formed from a core sheet sandwiched between two face sheets. The core sheet of a multilayer structure defines substantial void space and has an effective cross-sectional thickness that is substantially greater than the cross-sectional thicknesses of the adjacent face sheets. Therefore, multilayer structures typically possess relatively high strength and stiffness at relatively low weight. As such, multilayer structures are used in various aerospace applications.

Superplastic forming is a known technique for manufacturing multilayer structures, such as expanded two-sheet panels (no core sheet) and expanded three-sheet panels (a core sheet positioned between two face sheets), which may be used as alternatives to traditional honeycomb multilayer structures. Superplastic forming is a metal forming process that takes advantage of the superplasticity of certain materials, such as titanium alloys, aluminum alloys and nickel alloys, at elevated temperatures. When such materials are heated to a superplastic state, they become pliable and can be expanded (e.g., by gas pressure) against a mold to achieve a desired shape. During expansion, the material can experience elongation of several hundred percent.

While the void space in multilayer structures advantageously reduces density (increases bulk), it presents a complication when a multilayer structure is subjected to thermally induced stress due to thermal gradients in the multilayer structure. For example, the multilayer structure may comprise a three-sheet panel (i.e., a core sheet positioned between two face sheets) that is used in a thrust reverser of an aircraft engine. In this example implementation, one face sheet (i.e., the inner sheet) faces toward the aircraft engine, and the other face sheet (i.e., the outer sheet) on the other side of the core sheet faces away from the aircraft engine. Since the inner sheet is closer to the aircraft engine than the outer sheet, the inner sheet is exposed to higher temperatures than the outer sheet during operation of the aircraft engine. The thermal gradient between the inner sheet and the outer sheet results in thermally induced stress in the three-sheet panel.

Accordingly, those skilled in the art continue with research and development efforts in the field of multilayer structures including three-sheet panels.

SUMMARY

In one aspect, a panel comprises a first face sheet and a second face sheet spaced apart from the first face sheet. The panel further comprises a core sheet intercoupled between the first face sheet and the second face sheet. Each of the first and second face sheets is made of a material having a thermal expansion that is different from the thermal expansion of the other face sheet.

In another aspect, a method is provided of forming a three-sheet panel. The method comprises selecting a first face sheet made of a first thermal expansion material, and selecting a second face sheet made of a second thermal expansion material that is different from the first thermal expansion material. The method also comprises attaching each of the selected first and second face sheets to a core sheet to sandwich the core sheet between the first and second face sheets to provide a precursor panel. The method further comprises processing the precursor panel to form the three-sheet panel.

In yet another aspect, a method is provided of forming a three-sheet panel. The method comprises selecting a first face sheet made of INCOLOY Alloy 909, and selecting a second face sheet made of INCONEL Alloy 625. The method also comprises selecting a core sheet made of INCONEL Alloy 625, and attaching each of the selected first and second face sheets to the core sheet to sandwich the core sheet between the first and second face sheets to provide a precursor panel. The method further comprises processing the precursor panel to form the three-sheet panel.

In still another aspect, a method is provided of forming a three-sheet panel. The method comprises attaching a first face sheet and a second face sheet to a core sheet to sandwich the core sheet between the first and second face sheets. The method also comprises superplastic forming the first face sheet at a different rate of expansion than the second face sheet to form the three-sheet panel.

Other aspects will become apparent from the following detailed description, the accompanying drawings and the appended claims.

DETAILED DESCRIPTION

The present application is directed to panels and methods of forming three-sheet panels. The specific panel, forming method, and the industry in which the panel and forming method are implemented may vary. It is to be understood that the disclosure below provides a number of embodiments or examples for implementing different features of various embodiments. Specific examples of components and arrangements are described to simplify the present disclosure. These are merely examples and are not intended to be limiting.

By way of example, the disclosure below describes superplastic panels and methods of superplastic forming three-sheet panels for aircraft. More specifically, the disclosure below describes a superplastic formed three-sheet panel for use in a thrust reverser of an aircraft engine. The three-sheet panel and method of superplastic forming the three-sheet panel may be implemented by an original equipment manufacturer (OEM) for manufacturing superplastic panels in compliance with military and space regulations.

Figure 1:
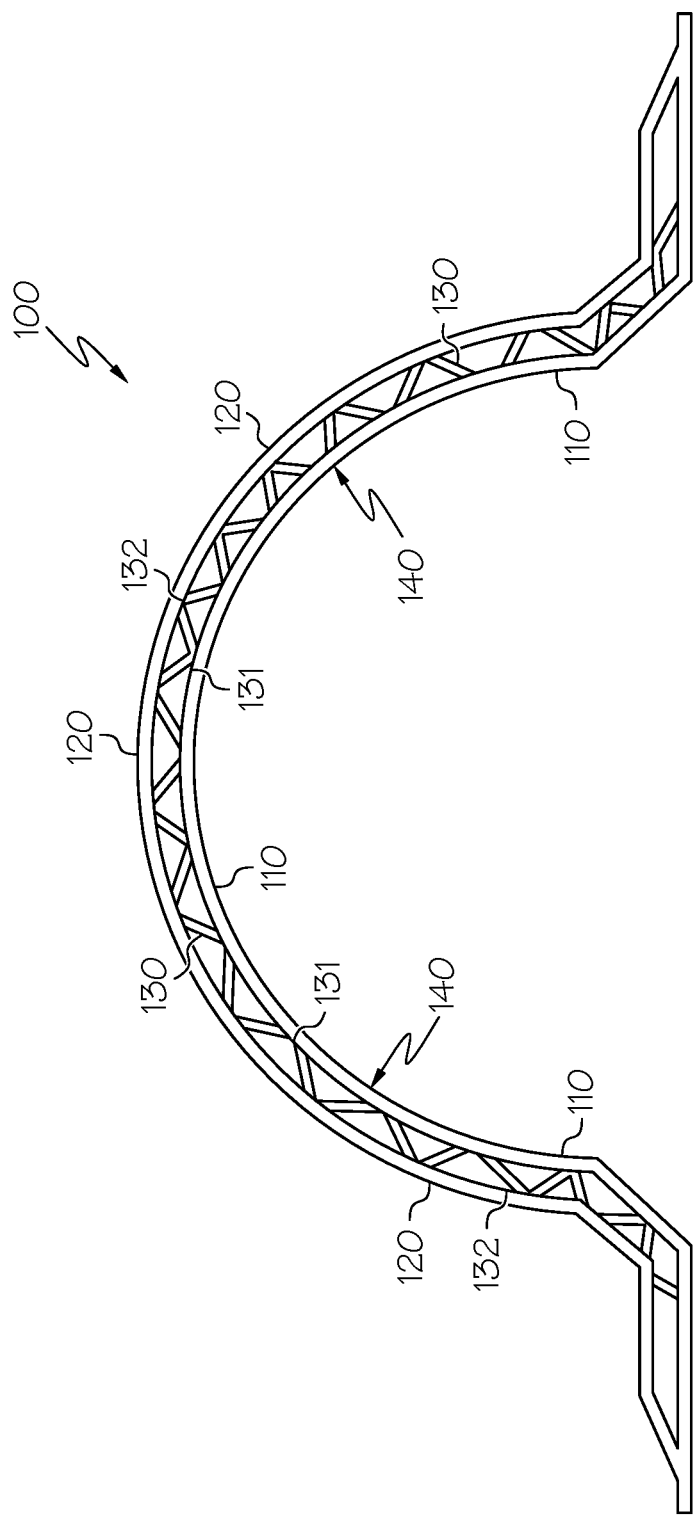
FIG. 1 is cross-sectional view of a superplastic three-sheet panel constructed in accordance with an example embodiment.

Referring to FIG. 1, a superplastic panel 100 constructed in accordance with an example embodiment is illustrated. Superplastic panel 100 includes a first face sheet 110, a second face sheet 120 spaced apart from the first face sheet 110, and a core sheet 130. The first face sheet 110, the second face sheet 120, and the core sheet 130 form a multi-layered structure 140.

While the multi-layered structure 140 of the superplastic panel 100 is shown and described having three layers (i.e., the first face sheet 110, the second face sheet 120, and the core sheet 130), additional layers, such as additional core sheets, additional face sheets and/or additional other sheets, may be included in the layered structure 140 without departing from the scope of the present disclosure.

The core sheet 130 of the superplastic panel 100 includes a first major side 131 and an opposed second major side 132. The first face sheet 110 may be connected (e.g., adhered, welded, braised, mechanically fastened etc.) to the first major side 131 of the core sheet 130 and the second face sheet 120 may be connected (e.g., adhered, welded, braised, mechanically fastened etc.) to the second major side 132 of the core sheet 130, thereby sandwiching the core sheet 130 between the first face sheet 110 and the second face sheet 120, and forming the layered structure 140.

Compositionally, each of the first and second face sheets 110, 120 of the superplastic panel 100, which may be single ply or multi-ply, may be formed from various materials or combinations of materials. The composition of each of the first and second face sheets 110, 120 may be the same as, similar to, or different from the composition of the core sheet 130. As one example, each of the first and second face sheets 110, 120 may be formed from a metal or metal alloy, such as steel, titanium, a titanium alloy, aluminum or an aluminum alloy. As another example, each of the first and second face sheets 110, 120 may be formed from a composite, such as a carbon fiber-reinforced composite or a fiberglass composite. As yet another example, each of the first and face sheets 110, 120 may be formed from a ceramic material. The composition of the first face sheet 110 may be the same as, similar to, or different from the composition of the second face sheet 120.

Each of the first and second face sheets 110, 120 is made of a material having a thermal expansion that is different from the thermal expansion of the other face sheet. The material of the first face sheet 110 comprises a low thermal expansion material, and the material of the second face sheet 120 comprises a high thermal expansion material. In some embodiments, the material of the first face sheet 110 comprises an iron alloy comprising 35.0 weight percent (wt %) to 40.0 wt % nickel, 12.0 wt % to 16.0 wt % cobalt, 4.3 wt % to 5.2 wt % niobium, and 1.3 wt % to 1.8 wt % titanium, commonly known as INCOLOY® Alloy 909. In some embodiments, the material of the second face sheet 120 comprises a nickel alloy comprising at least 58.0 wt % nickel, 20.0 wt % to 23.0 wt % chromium, at most 5.0 wt % iron, 8.0 wt % to 10.0 wt % molybdenum, and 3.15 wt % to 4.15 wt % niobium, commonly known as INCONEL® Alloy 625. INCOLOY and INCONEL are trademarks of Special Metals Corporation.

In some embodiments, the first face sheet 110 has a coefficient of thermal expansion between about 4.0 parts-per-million per degrees Fahrenheit (ppm/° F.) and about 5.5 ppm/° F. The first face sheet 110 has a thickness between about 0.01 inches (0.025 centimeters) and about 0.125 inches (0.318 centimeters). The first face sheet 110 has a density between about 0.25 lbs/in$^3$ and about 0.40 lbs/in$^3$.

In some embodiments, the second face sheet 120 has a coefficient of thermal expansion between about 7 ppm/° F. and about 10 ppm/° F. The second face sheet 120 has a thickness between about 0.01 inches (0.025 centimeters) and about 0.125 inches (0.318 centimeters). The second face sheet 120 has a density between about 0.25 lbs/in$^3$ and about 0.40 lbs/in$^3$.

In some embodiments, the core sheet 130 has a coefficient of thermal expansion between about 7 ppm/° F. and about 10 ppm/° F. The core sheet 130 is intercoupled between the first face sheet 110 and the second face sheet 120. The core sheet 130 has a thickness between about 0.01 inches (0.025 centimeters) and about 0.10 inches (0.254 centimeters). The core sheet 130 has a density between about 0.25 lbs/in$^3$ and about 0.40 lbs/in$^3$. An example core sheet material is commercially available as part number CarTech® 625 Alloy. CarTech is a trademark of Carpenter Technology Corporation. Other materials that can be used for the core sheet 130 are possible.

In some embodiments, the cross-sectional thickness of the core sheet 130 may be relatively thick, as compared to the cross-sectional thickness of the first face sheet 110 and the cross-sectional thickness of the second face sheet 120. In some embodiments, despite being relatively thick, the core sheet 130 has a relatively lower density (basis weight divided by cross-sectional thickness), as compared to the densities of the first face sheet 110 and the second face sheet 120.

Figure 2:
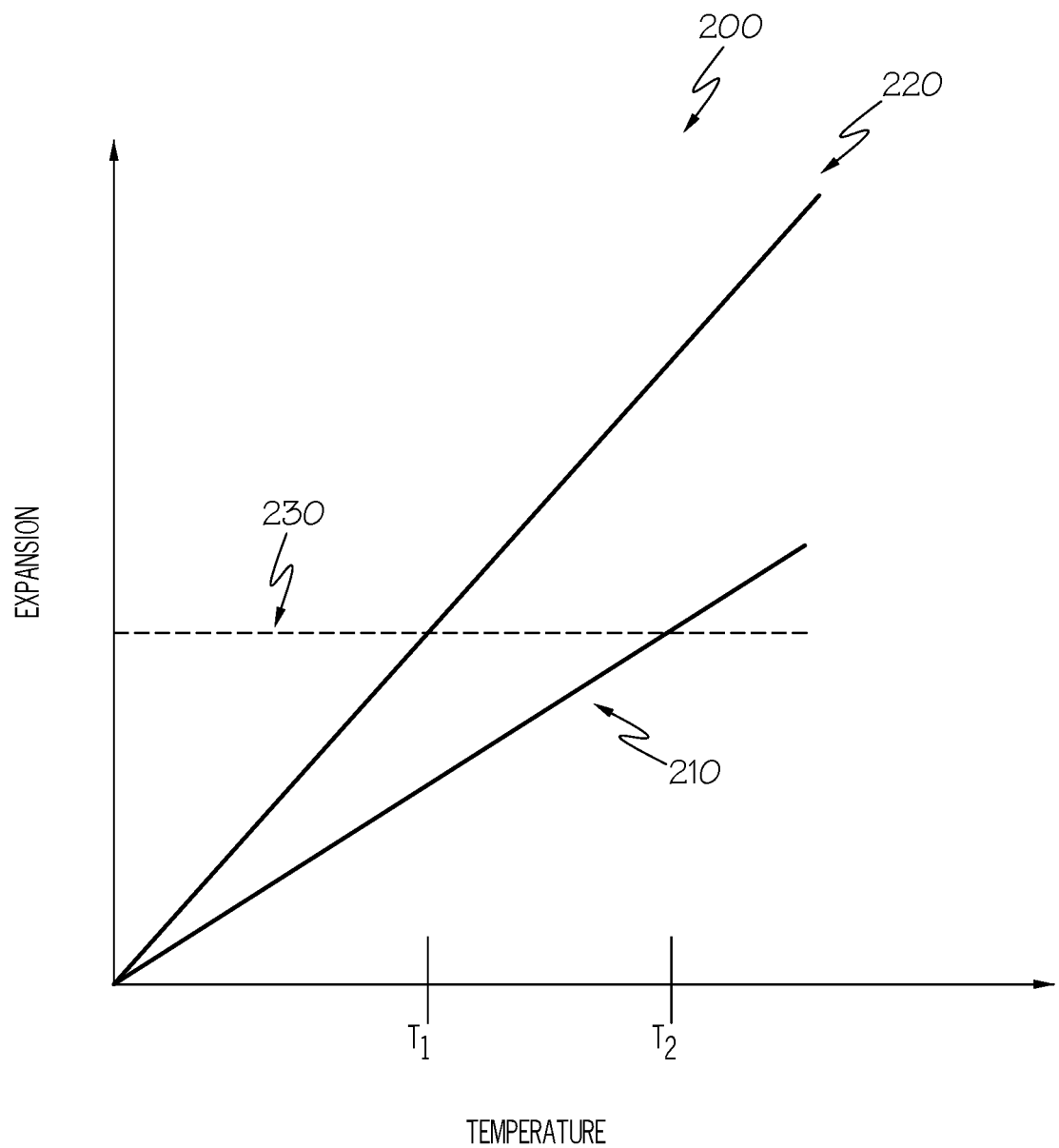
FIG. 2 is a thermal expansion profile of example suitable materials that can be used to make the superplastic panel of FIG. 1.

Referring to FIG. 2, an example thermal expansion profile 200 of suitable materials (i.e., for the first and second face sheets 110, 120) that can be used to make the superplastic panel 100 of FIG. 1 is illustrated. First solid diagonal line 210 represents the lower thermal expansion of the first face sheet 110, and second solid diagonal line 220 represents the higher thermal expansion of the second face sheet 120. Dashed horizontal line 230 intersects the second diagonal line 220 at a lower temperature $T_1$, and intersects the first diagonal line 210 at a higher temperature $T_2$. The difference between the higher temperature $T_2$ and the lower temperature $T_1$ is up to 800° F.

The combination of the first face sheet 110, the second face sheet 120, and the core sheet 130 cooperate to enable superplastic panel 100 to withstand a temperature up to or above 1000° F. without degradation of the superplastic panel 100 when the first face sheet 110 is exposed to more heat than the second face sheet 120, such as when the superplastic panel 100 is installed and in service on a thrust reverser of an aircraft engine.

Figure 3:
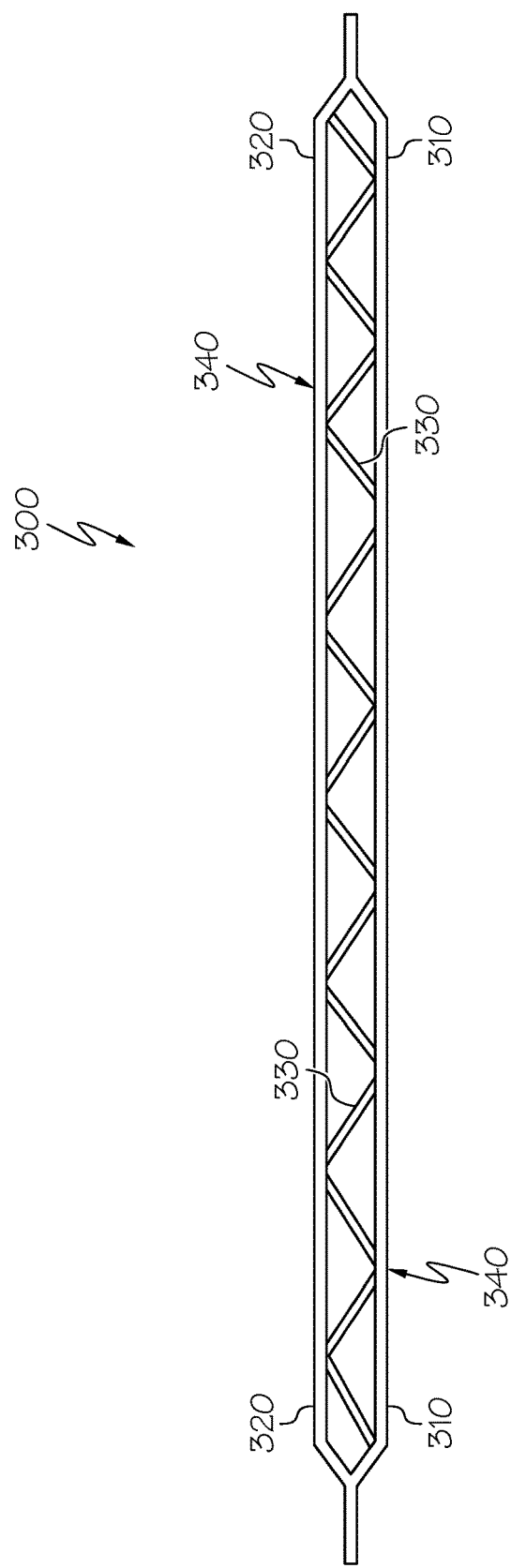
FIG. 3 is cross-sectional view of a superplastic three-sheet panel constructed in accordance with another example embodiment.

Those skilled in the art will appreciate that only a portion of the superplastic panel 100 is shown in FIG. 1, and that the overall size and shape of the superplastic panel 100 may depend on the end application. For example, the disclosed superplastic panel 100 may be used as a wall panel forming the inlet inner wall, fan duct and/or exhaust nozzle of a bypass gas turbine aircraft engine and, therefore, may be sized, shaped and contoured accordingly. Additionally, while the superplastic panel 100 is shown in FIG. 1 as being a substantially curved structure, planar superplastic panels, such as superplastic panel 300 shown in FIG. 3, are also contemplated. As shown in FIG. 3, superplastic panel 300 includes first face sheet 310, second face sheet 320, and core sheet 330 between first and second face sheets 110, 120 to form multi-layered structure 340. Other cross-sectional profiles of superplastic panels are possible.

The following example illustrates a method of superplastic forming a three-sheet panel in accordance with an embodiment. The example superplastic forming method is intended to illustrate, but in no way limits, the scope of the invention.

Figure 4:
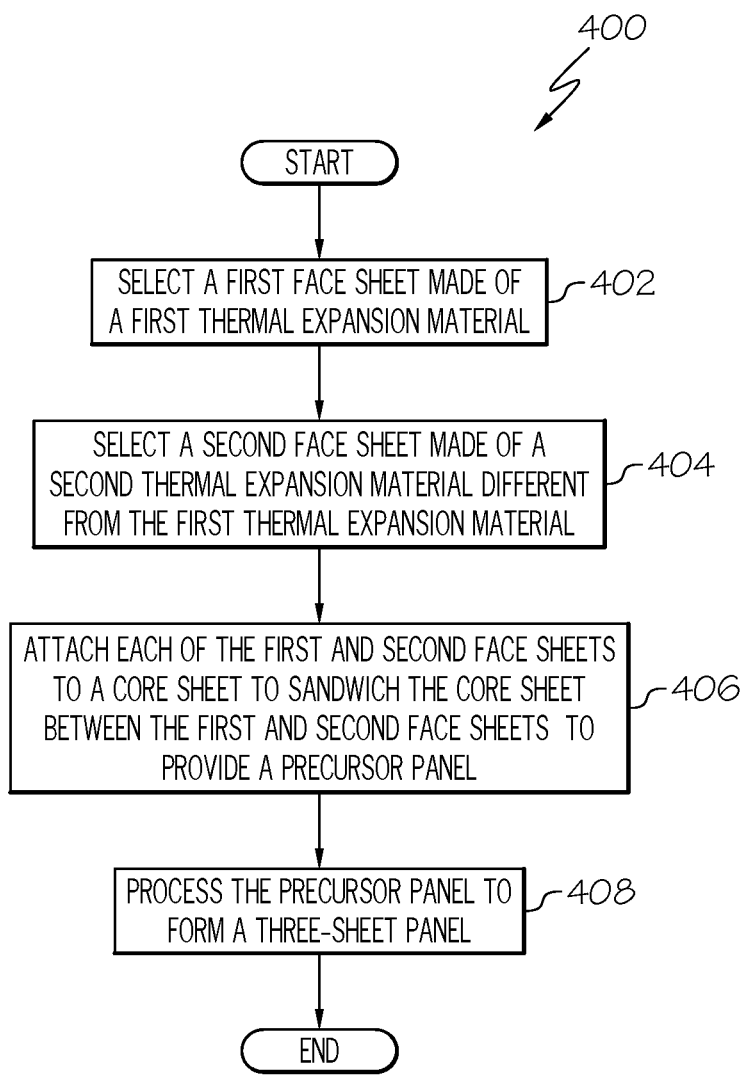
FIG. 4 is a flow diagram illustrating an example method of superplastic forming a three-sheet panel in accordance with an example embodiment.

Referring to FIG. 4, a flow diagram 400 is shown illustrating an example method of superplastic forming example superplastic three-sheet panel 100 of FIG. 1 (or example superplastic panel 300 of FIG. 3) in accordance with an embodiment. The superplastic forming method 400 disclosed herein may be employed according to FAA regulations, for example. Specifications of FAA regulations for forming superplastic panels are known and, therefore, will not be described.

In block 402, a first face sheet made of a first thermal expansion material is selected. In block 404, a second face sheet made of a second thermal expansion material that is different from the first thermal expansion material is selected. In some embodiments, the selecting of the first face sheet made of the first thermal expansion material includes selecting material of the first face sheet to be a low expansion material, and the selecting of the second face sheet made of the second thermal expansion material that is different from the first thermal expansion material includes selecting material of the second face sheet to be a high expansion material.

In some embodiments, the selecting material of the first face sheet to be a low expansion material includes selecting material of the first face sheet to be INCOLOY Alloy 909, and the selecting material of the second face sheet to be a high expansion material includes selecting material of the second face sheet to be INCONEL Alloy 625.

Then, in block 406, each of the selected first and second face sheets is attached to a core sheet to sandwich the core sheet between the first and second face sheets to provide a precursor panel. In some embodiments, the core sheet is selected with a thickness that is greater than thickness of each of the selected first and second face sheets. In some embodiments, the material of the core sheet is selected to be INCONEL Alloy 625. In some embodiments, the attaching each of the selected first and second face sheets to a core sheet to sandwich the core sheet between the first and second face sheets to provide a precursor panel includes welding each of the selected first and second face sheets to the core sheet to provide the precursor panel. In block 408, the precursor panel is processed to form the three-sheet panel. Since the first thermal expansion material of the first face sheet and the second thermal expansion material of the second face sheet are different from each other, the core sheet is pulled into a desired shape. More specifically, the differential thermal expansion of the two materials pulls the core sheet into a desired shape. The process then ends.

Figure 5:
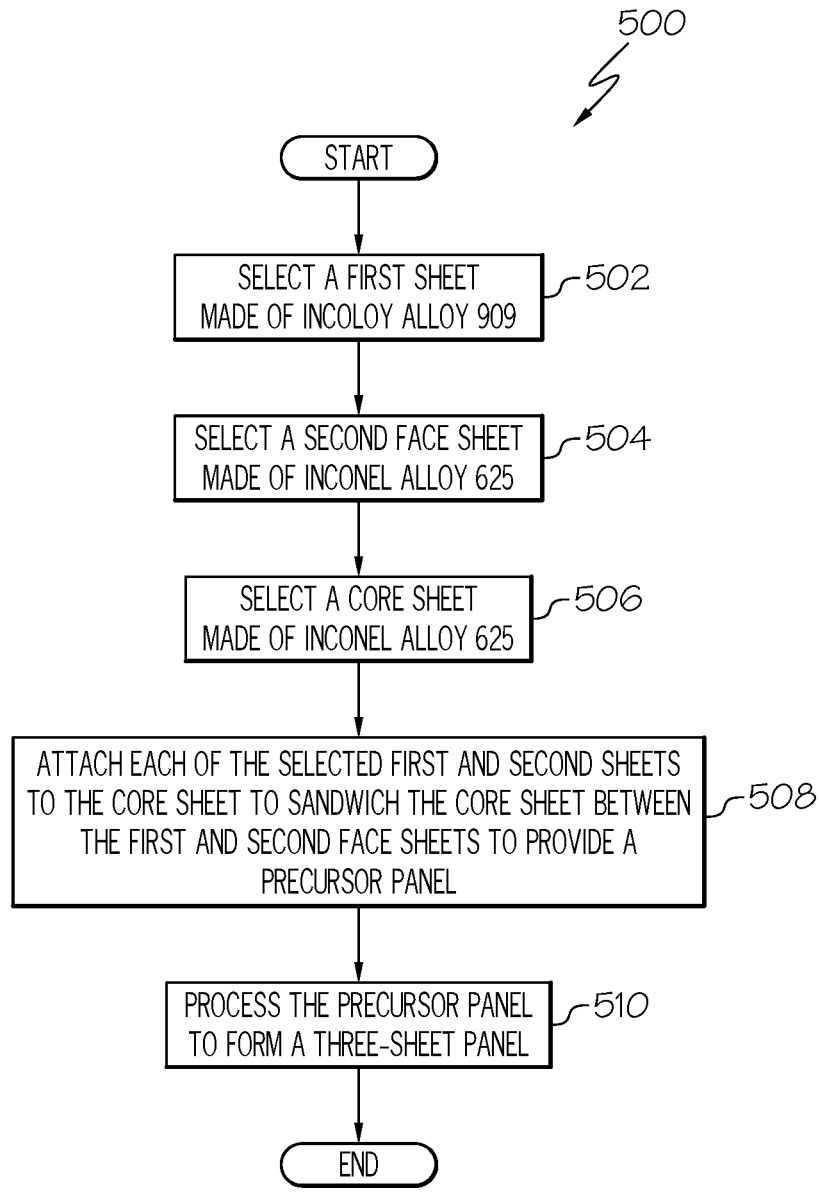
FIG. 5 is a flow diagram illustrating another example method of superplastic forming a three-sheet panel in accordance with another example embodiment.

Referring to FIG. 5, a flow diagram 500 is shown illustrating a method of superplastic forming example superplastic three-sheet panel 100 of FIG. 1 (or example superplastic panel 300 of FIG. 3) in accordance with another embodiment. The superplastic forming method 500 disclosed herein may be employed according to military and space regulations, for example.

In block 502, a first face sheet made of INCOLOY Alloy 909 is selected. In block 504, a second face sheet made of INCONEL Alloy 625 is selected. In block 506, a core sheet made of INCONEL Alloy 625 is selected. Then, in block 508, each of the selected first and second face sheets is attached to the core sheet to sandwich the core sheet between the first and second face sheets to provide a precursor panel. In block 510, the precursor panel is processed to form the three-sheet panel. Since the first face sheet is made of INCOLOY Alloy 909 and the second face sheet is made of INCONEL Alloy 625, the core sheet is pulled into a desired shape. More specifically, the differential thermal expansion of the INCOLOY Alloy 909 and the INCONEL Alloy 625 pulls the core sheet into a desired shape. The process then ends.

Figure 6:
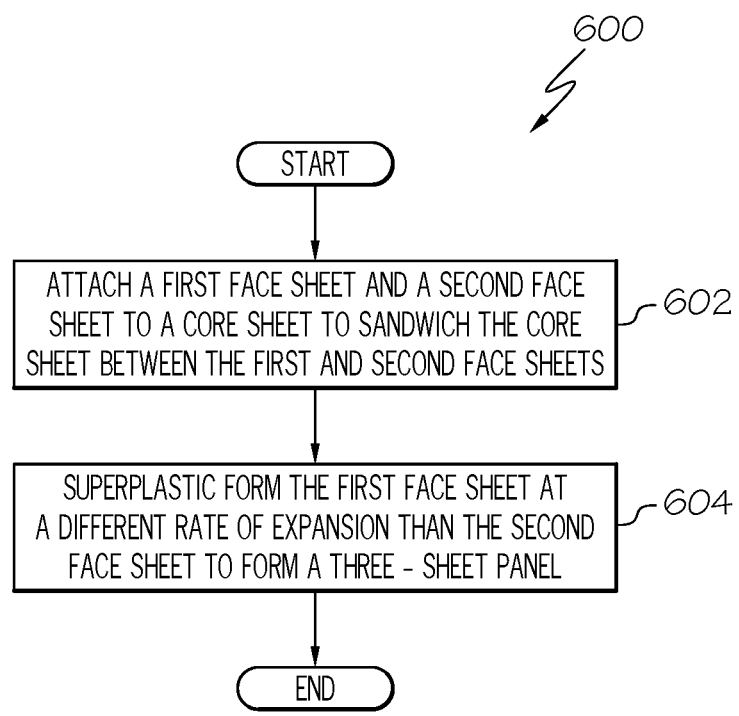
FIG. 6 is a flow diagram illustrating another example method of superplastic forming a three-sheet panel in accordance with another example embodiment.

Referring to FIG. 6, a flow diagram 600 is shown illustrating a method of superplastic forming example superplastic three-sheet panel 100 of FIG. 1 (or example superplastic panel 300 of FIG. 3) in accordance with yet another embodiment. The superplastic forming method 600 disclosed herein may be employed according to military and space regulations, for example.

In block 602, a first face sheet and a second face sheet are attached to a core sheet to sandwich the core sheet between the first and second face sheets. Then, in block 604, the first face sheet is superplastic formed at a different rate of expansion than the second face sheet to form the three-sheet panel. In some embodiments, the superplastic forming the first face sheet at a different rate of expansion than the second face sheet to form the three-sheet panel includes expanding one of the first and second face sheets at a first time and then expanding the other one of the first and second face sheets at a second time which is after the first time to pull the core sheet into a desired shape. In some embodiments, the superplastic forming the first face sheet at a different rate of expansion than the second face sheet to form the three-sheet panel includes expanding the first and second face sheets at the same time to pull the core sheet into a desired shape.

The above-described example superplastic forming methods may be carried out using manufacturing systems or apparatus suitable for making multilayer structures such as three-sheet panels. Numerous manufacturing systems or apparatus for making three-sheet panels are known and, therefore, will not be described.

Figure 7:
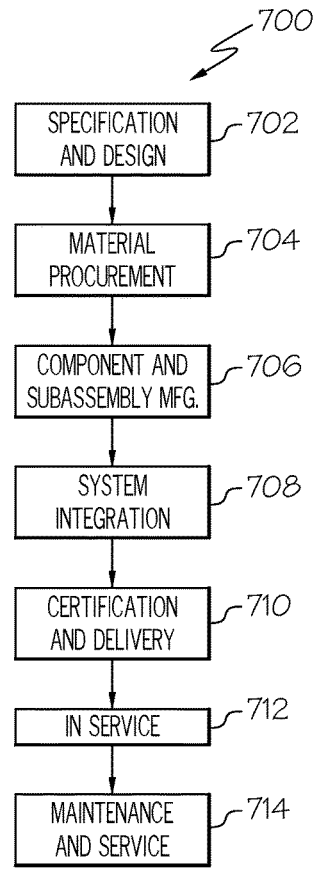
FIG. 7 is a flow diagram of an aircraft manufacturing and service methodology.
Figure 8:
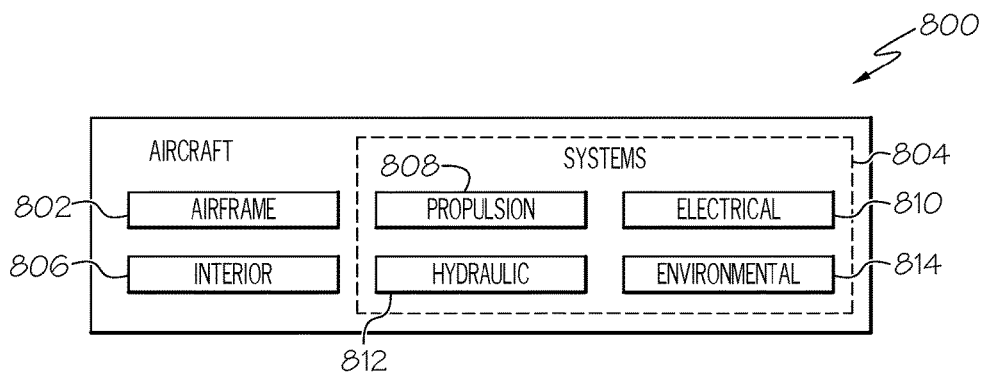
FIG. 8 is a block diagram of an aircraft.

Examples of the present disclosure may be described in the context of an aircraft manufacturing and service method 700 as shown in FIG. 7 and an aircraft 800 as shown in FIG. 8. During pre-production, the illustrative method 700 may include specification and design, as shown at block 702, of the aircraft 800 and material procurement, as shown at block 704. During production, component and subassembly manufacturing, as shown at block 706, and system integration, as shown at block 708, of the aircraft 800 may take place. Thereafter, the aircraft 800 may go through certification and delivery, as shown block 710, to be placed in service, as shown at block 712. While in service, the aircraft 800 may be scheduled for routine maintenance and service, as shown at block 714. Routine maintenance and service may include modification, reconfiguration, refurbishment, etc. of one or more systems of the aircraft 800.

Each of the processes of illustrative method 700 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 8, the aircraft 800 produced by illustrative method 700 (FIG. 7) may include an airframe 802 with a plurality of high-level systems 804 and an interior 806. Examples of high-level systems 804 may include one or more of propulsion system 808, electrical system 810, hydraulic system 812, and environmental system 814. Any number of other systems may be included. Superplastic panels and superplastic forming methods shown or described herein may be employed in any combination of these systems.

Moreover, superplastic panels and superplastic forming methods shown or described herein may be employed during any one or more of the stages of the manufacturing and service method 700. For example, components or subassemblies corresponding to component and subassembly manufacturing (block 706) may be fabricated or manufactured in a manner similar to components or subassemblies produced while aircraft 800 is in service (block 712). Also, one or more examples of superplastic panels and superplastic forming methods, or combination thereof, may be utilized during production stages (blocks 708 and 710). Similarly, one more examples of superplastic panels and superplastic forming methods, or a combination thereof, may be utilized, for example and without limitation, while aircraft 800 is in service (block 712) and during maintenance and service stage (block 714).

It should be apparent that a superplastic panel produced in accordance with above-described example methods is suitable for any type of application. The superplastic panel is especially advantageous when there is a thermal gradient during use of the superplastic panel, such as in a thrust reverser of an aircraft engine, for example. The difference in thermal expansion between the inner face sheet (i.e., the inner wall with the lower thermal expansion coefficient and closer to the aircraft engine) and the outer face sheet (i.e., the outer wall with the higher thermal expansion coefficient and farther away from the aircraft engine) reduces thermally induced stress in the superplastic panel. As such, the superplastic panel is capable of operating at higher temperatures with reduced thermally induced stress. The result is a superplastic panel that does not need to be replaced as often due to potential delamination of the inner and outer face sheets. This lowers maintenance and service costs.

It should also be apparent that the difference in thermal expansion between the first and second face sheets 110, 120 of the superplastic panel 100 eliminates the need for a thick laminate of the first face sheet 110. This is because the thermal stress induced in the first face sheet 110 is reduced due to the lower thermal expansion of the first face sheet 110. The result is a weight-efficient superplastic panel (as compared to known superplastic panels) with a capability to handle temperatures up to or above 1000° F. without degradation of the superplastic panel when the superplastic panel is installed and in service in a particular application. Accordingly, the superplastic panel 100 has not only high-temperature capability, but also has low weight (i.e., weight-competitive).

It should further be apparent that the material of the first face sheet 110 and the material of the second face sheet 120 of the superplastic panel 100 can each be selected and tailored to reduce thermally induced stress in the superplastic panel 100 depending upon the particular application of the superplastic panel (e.g., in an inner wall/outer wall of a thrust reverser of an aircraft engine).

Although an aerospace example is shown, the principles disclosed herein may be applied to other industries, such as the automotive industry, the marine industry, and the construction industry. Accordingly, in addition to the aircraft 800, the principles disclosed herein may apply to other vehicles (e.g., land vehicles, marine vehicles, space vehicles, etc.) as well as to other types of structures.

Although the above description describes a three-layer structure in which the middle layer comprises a core sheet construction, it is conceivable that the middle layer may comprise a construction that is other than a core sheet. As an example, the middle layer may comprise a brazed honeycomb construction. Other constructions of the middle layer of the three-layer structure are possible.

Although the above description describes example superplastic panels and example methods of superplastic forming three-sheet panels for OEMs in accordance with military and space regulations, it is conceivable that the example superplastic panels and superplastic forming methods may be implemented in any industry in accordance with the applicable industry standards.

Also, although the above description describes a superplastic forming method to make a three-sheet panel, it is conceivable that other forming methods may be used.

Further, although various embodiments of the disclosed superplastic panels and superplastic forming methods have been shown and described, modifications may occur to those skilled in the art upon reading the specification. The present application includes such modifications and is limited only by the scope of the claims.

What is claimed is:

1. A method of forming an expanded three-sheet panel, the method comprising:
    selecting a first face sheet made of a first thermal expansion material that has a first coefficient of thermal expansion between about 4.0 ppm/° F. and about 5.5 ppm/° F.;
    selecting a second face sheet made of a second thermal expansion material that is different from the first thermal expansion material and that has a second coefficient of thermal expansion between about 7 ppm/° F. and about 10 ppm/° F.;
    attaching each of the selected first and second face sheets to a core sheet to sandwich the core sheet between the first and second face sheets to provide a precursor panel; and
    processing the precursor panel to form the expanded three-sheet panel.

2. The method of claim 1 wherein selecting the first face sheet made of the first thermal expansion material includes selecting material of the first face sheet to be an iron alloy comprising 35.0 wt % to 40.0 wt % nickel, 12.0 wt % to 16.0 wt % cobalt, 4.3 wt % to 5.2 wt % niobium, and 1.3 wt % to 1.8 wt % titanium.

3. The method of claim 1 wherein selecting the second face sheet made of the second thermal expansion material includes selecting material of the second face sheet to be a nickel alloy comprising at least 58.0 wt % nickel, 20.0 wt % to 23.0 wt % chromium, at most 5.0 wt % iron, 8.0 wt % to 10.0 wt % molybdenum, and 3.15 wt % to 4.15 wt % niobium.

4. The method of claim 1 further comprising:
    selecting the core sheet with a thickness that is greater than thickness of each of the selected first and second face sheets.

5. The method of claim 4 wherein selecting the core sheet with a thickness that is greater than thickness of each of the selected first and second face sheet includes selecting material of the core sheet to be a nickel alloy comprising at least 58.0 wt % nickel, 20.0 wt % to 23.0 wt % chromium, at most 5.0 wt % iron, 8.0 wt % to 10.0 wt % molybdenum, and 3.15 wt % to 4.15 wt % niobium.

6. The method of claim 1 wherein attaching each of the selected first and second face sheets to a core sheet to sandwich the core sheet between the first and second face sheets to provide a precursor panel includes welding each of the selected first and second face sheets to the core sheet to provide the precursor panel.

7. The method of claim 1 wherein the method comprises a superplastic forming method.

8. The method of claim 1 wherein selecting the first face sheet made of the first thermal expansion material includes selecting the first face sheet having a thickness between about 0.10 inches (0.025 centimeters) and about 0.125 inches (0.318 centimeters).

9. The method of claim 1 wherein selecting the second face sheet made of the second thermal expansion material includes selecting the second face sheet having a thickness between about 0.01 inches (0.025 centimeters) and about 0.125 inches (0.318 centimeters).

10. The method of claim 1 further comprising selecting the core sheet having a thickness between about 0.01 inches (0.025 centimeters) and about 0.10 inches (0.254 centimeters).

11. The method of claim 1 wherein selecting the first face sheet made of the first thermal expansion material includes selecting the first face sheet having a density between about 0.25 lbs/in$^3$ and about 0.40 lbs/in$^3$.

12. The method of claim 1 wherein selecting the second face sheet made of the second thermal expansion material includes selecting the second face sheet having a density between about 0.25 lbs/in$^3$ and about 0.40 lbs/in$^3$.

13. The method of claim 1 further comprising selecting the core sheet has a density between about 0.25 lbs/in$^3$ and about 0.40 lbs/in$^3$.

14. A method of forming an expanded three-sheet panel, the method comprising:
   selecting a first face sheet made of an iron alloy comprising 35.0 wt % to 40.0 wt % nickel, 12.0 wt % to 16.0 wt % cobalt, 4.3 wt % to 5.2 wt % niobium, and 1.3 wt % to 1.8 wt % titanium;
   selecting a second face sheet made of a nickel alloy comprising at least 58.0 wt % nickel, 20.0 wt % to 23.0 wt % chromium, at most 5.0 wt % iron, 8.0 wt % to 10.0 wt % molybdenum, and 3.15 wt % to 4.15 wt % niobium;
   selecting a core sheet made of a nickel alloy comprising at least 58.0 wt % nickel, 20.0 wt % to 23.0 wt % chromium, at most 5.0 wt % iron, 8.0 wt % to 10.0 wt % molybdenum, and 3.15 wt % to 4.15 wt % niobium;
   attaching each of the selected first and second face sheets to the core sheet to sandwich the core sheet between the first and second face sheets to provide a precursor panel; and
   processing the precursor panel to form the expanded three-sheet panel.

15. The method of claim 14 wherein the method comprises a superplastic forming method.

16. A method of forming an expanded three-sheet panel, the method comprising:
   attaching a first face sheet and a second face sheet to a core sheet to sandwich the core sheet between the first and second face sheets, wherein the first face sheet is made of an iron alloy comprising 35.0 wt % to 40.0 wt % nickel, 12.0 wt % to 16.0 wt % cobalt, 4.3 wt % to 5.2 wt % niobium, and 1.3 wt % to 1.8 wt % titanium and the second face sheet is made of a thermal expansion material that has a coefficient of thermal expansion that is greater than the coefficient of thermal expansion of the iron alloy; and
   superplastic forming the first face sheet at a different rate of expansion than the second face sheet to form the expanded three-sheet panel.

17. The method of claim 16 wherein superplastic forming the first face sheet at a different rate of expansion than the second face sheet to form the three-sheet panel includes expanding one of the first and second face sheets at a first time and then expanding the other one of the first and second face sheets at a second time which is after the first time to pull the core sheet into a desired shape.

18. The method of claim 16 wherein superplastic forming the first face sheet at a different rate of expansion than the second face sheet to form the three-sheet panel includes expanding the first and second face sheets at the same time to pull the core sheet into a desired shape.

19. The method of claim 16 wherein the first face sheet can withstand a temperature up to or above 1000° F. higher than the second face sheet without degradation of the three-sheet panel when the first face sheet is exposed to more heat than the second face sheet.

20. A method of forming an expanded three-sheet panel, the method comprising:
   attaching a first face sheet and a second face sheet to a core sheet to sandwich the core sheet between the first and second face sheets, wherein the first face sheet is made of a first thermal expansion material that has a first coefficient of thermal expansion between about 4.0 ppm/° F. and about 5.5 ppm/° F. and the second face sheet is made of a second thermal expansion material that has a second coefficient of thermal expansion that is between about 7 ppm/° F and about -b 10 ppm/° F; and
   superplastic forming the first face sheet at a different rate of expansion than the second face sheet to form the expanded three-sheet panel.

21. The method of claim 20 wherein the first face sheet can withstand a temperature up to or above 1000° F. higher than the second face sheet without degradation of the three-sheet panel when the first face sheet is exposed to more heat than the second face sheet.

22. The method of claim 20 wherein the core sheet has a coefficient of thermal expansion between about 7 ppm/° F. and about 10 ppm/° F.

23. The method of claim 20 wherein superplastic forming the first face sheet at a different rate of expansion than the second face sheet to form the three-sheet panel includes one of:
   expanding one of the first and second face sheets at a first time and then expanding the other one of the first and second face sheets at a second time which is after the first time to pull the core sheet into a desired shape; or
   expanding the first and second face sheets at the same time to pull the core sheet into a desired shape.

* * * * *